United States Patent
Li

(10) Patent No.: US 9,944,551 B2
(45) Date of Patent: Apr. 17, 2018

(54) GLASS COMPOSITIONS, FIBERIZABLE GLASS COMPOSITIONS, AND GLASS FIBERS MADE THEREFROM

(71) Applicant: PPG Industries, Inc., Cleveland, OH (US)

(72) Inventor: Hong Li, Sewickley, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 14/706,049

(22) Filed: May 7, 2015

(65) Prior Publication Data

US 2016/0326045 A1    Nov. 10, 2016

(51) Int. Cl.
| | |
|---|---|
| *C03C 3/087* | (2006.01) |
| *C03C 13/00* | (2006.01) |
| *C03C 3/118* | (2006.01) |
| *C03C 3/112* | (2006.01) |
| *C03C 3/095* | (2006.01) |

(52) U.S. Cl.
CPC .............. *C03C 13/00* (2013.01); *C03C 3/095* (2013.01); *C03C 3/112* (2013.01); *C03C 3/118* (2013.01); *C03C 2213/00* (2013.01)

(58) Field of Classification Search
CPC .......... C03C 3/087; C03C 13/00; C03C 13/06
See application file for complete search history.

(56) References Cited

U.S. PATENT DOCUMENTS

| | | | | |
|---|---|---|---|---|
| 2011/0039681 A1* | 2/2011 | Lecomte | ................ | C03C 3/087 501/38 |
| 2013/0210962 A1* | 8/2013 | Hofmann | ................ | C03C 3/085 523/437 |
| 2014/0128530 A1* | 5/2014 | Yang | ....................... | C03B 37/02 524/405 |

FOREIGN PATENT DOCUMENTS

| | | | | | |
|---|---|---|---|---|---|
| GB | 2233643 A | * | 1/1991 | ............. | C03C 13/00 |
| JP | 2002-154843 | | 5/2002 | | |
| WO | WO 2011113303 A1 | * | 9/2011 | ............. | C03C 13/00 |
| WO | WO 2014062987 A2 | * | 4/2014 | ............. | C03C 3/085 |

OTHER PUBLICATIONS

Patent Cooperation Treaty, International Search Report and Written Opinion, Application No. PCT/US16/30497 dated Oct. 14, 2016.

* cited by examiner

*Primary Examiner* — Elizabeth A. Bolden
(74) *Attorney, Agent, or Firm* — Kilpatrick Townsend & Stockton LLP

(57) ABSTRACT

New glass compositions and applications thereof are disclosed. Embodiments of the present invention relate to glass compositions, to fiber glass strands, to chopped fiber glass strands, to nonwoven mats of glass fibers, and to other products and methods. A fiber glass strand comprises a plurality of glass fibers comprising the glass composition of the present invention.

22 Claims, No Drawings of the claims, each numerical
GLASS COMPOSITIONS, FIBERIZABLE GLASS COMPOSITIONS, AND GLASS FIBERS MADE THEREFROM

FIELD OF THE INVENTION

The present invention relates to glass compositions and, in particular, to glass compositions for forming fibers.

BACKGROUND OF THE INVENTION

Glass fibers have been used to reinforce various polymeric resins for many years. Some commonly used glass compositions for use in reinforcement applications include the "E-glass" and "D-glass" families of compositions. Another commonly used glass composition is commercially available from AGY (Aiken, S.C.) under the trade name "S-2 Glass."

In reinforcement and other applications, certain mechanical properties of glass fibers or of composites reinforced with glass fibers can be important. However, in many instances, the manufacture of glass fibers having improved mechanical properties (e.g., higher strength, higher modulus, etc.) can result in higher costs due, for example, due to increased batch material costs, increased manufacturing costs, or other factors. For example, the aforementioned "S-2 Glass" has improved mechanical properties as compared to conventional E-glass but costs significantly more as well as a result of substantially higher temperature and energy demands for batch-to-glass conversion, melt fining, and fiber drawing. Fiber glass manufacturers continue to seek glass compositions that can be used to form glass fibers having desirable mechanical properties in a commercial manufacturing environment.

SUMMARY

Various embodiments of the present invention provide glass compositions, fiberizable glass compositions, and glass fibers formed from such compositions.

These and other embodiments of the present invention are described in greater detail in the Detailed Description that follows.

DETAILED DESCRIPTION

Unless indicated to the contrary, the numerical parameters set forth in the following specification are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

It is further noted that, as used in this specification, the singular forms "a," "an," and "the" include plural referents unless expressly and unequivocally limited to one referent.

The present invention relates generally to glass compositions. In one aspect, the present invention provides glass fibers formed from glass compositions described herein. In some embodiments, glass fibers of the present invention can have improved mechanical properties, such as Young's modulus and pristine strength, as compared to conventional E-glass fibers. In addition, the compositions have improved thermal expansion coefficients and glass transition temperatures.

In some embodiments, a glass composition of the present invention is suitable for fiber forming and comprises 47 to 64 weight percent $SiO_2$, 22 to 36 weight percent $Al_2O_3$, 1 to 15 weight percent MgO, 0.5 to 7 weight percent CaO, 0 to 2 weight percent $Na_2O$, 0 to 1 weight percent $K_2O$, 0 to 5 weight percent $Li_2O$, 0 to 3 weight percent $B_2O_3$, 0 to 1 weight percent $Fe_2O_3$, 0 to 2 weigh percent $F_2$, 0 to 2 weight percent $TiO_2$, and 0 to 8 weight percent of other constituents.

The SiO2 content, in some embodiments, is between 50 and 60 weight percent. In some embodiments, the $Al_2O_3$ content is between 24 and 35 weight percent. The MgO content is between 2 and 12 weight percent in some embodiments. The combined content of $Al_2O_3$ and MgO ($Al_2O_3$+MgO), in some embodiments can be at least 30 weight percent. In some embodiments, the $Al_2O_3$+MgO content is between 30 weight percent and 50 weight percent.

In some embodiments, the CaO content is less than 4 weight percent. The total content of CaO and MgO (MgO+CaO content) is less than 16 weight percent in some embodiments. The MgO+CaO content, in some embodiments, is between 7 and 15 weight percent.

In some embodiments, the glass composition can be substantially free of $B_2O_3$. The $B_2O_3$ content, in some embodiments, is less than 2.1 weight percent. The $B_2O_3$ content is less than 1 weight percent in some embodiments.

In some embodiments, the $Na_2O$ content is 0 to 1 weight percent. The $Li_2O$ content, in some embodiments, is 1 or more weight percent. In some embodiments, the $Li_2O$ content is 3 or less weight percent.

Glass compositions of the present invention, in some embodiments, can comprise one or more rare earth oxides in an amount greater than 0.05 weight percent. In some embodiments, the one or more rare earth oxides can comprise at least one of $La_2O_3$, $CeO_2$, $Y_2O_3$ and $Sc_2O_3$. In some embodiments, the one or more rare earth oxides are present in an amount up to 10 weight percent. The one or more rare earth oxides are present in an amount between 2 and 10 weight percent in some embodiments. The one or more rare earth oxides, in some embodiments, are present in an amount between 5 and 10 weight percent.

In some embodiments, glass compositions of the present invention are substantially free of BaO. Glass compositions of the present invention, in some embodiments, comprise 0 to 0.05 weight percent BaO. In some embodiments, glass compositions of the present invention are substantially free of SrO. Glass compositions of the present invention, in some embodiments, comprise 0 to 0.05 weight percent SrO.

In some embodiments, a glass composition of the present invention is suitable for fiber forming and comprises 50 to 60 weight percent $SiO_2$, 24 to 36 weight percent $Al_2O_3$, 2 to 12 weight percent MgO, 1 to 4 weight percent CaO, 0 to 2 weight percent $Na_2O$, 0 to 1 weight percent $K_2O$, 0 to 5 weight percent $Li_2O$, 0 to 3 weight percent $B_2O_3$, 0 to 1 weight percent $Fe_2O_3$, 0 to 2 weight percent $F_2$, 0 to 2 weight percent $TiO_2$, and 0 to 8 weight percent of other constituents.

In some embodiments, the $Al_2O_3$ content is between 24 and 35 weight percent. The combined content of $Al_2O_3$ and MgO ($Al_2O_3$+MgO), in some embodiments can be at least 30 weight percent. In some embodiments, the $Al_2O_3$+MgO content is between 30 weight percent and 50 weight percent. In some embodiments, the MgO+CaO content is greater than 7 weight percent.

In some embodiments, the glass composition can be substantially free of $B_2O_3$. The $B_2O_3$ content, in some embodiments, is less than 2.1 weight percent. The $B_2O_3$ content is less than 1 weight percent in some embodiments.

In some embodiments, the $Na_2O$ content is 0 to 1 weight percent. The $Li_2O$ content, in some embodiments, is 1 or more weight percent. In some embodiments, the $Li_2O$ content is 3 or less weight percent.

Glass compositions of the present invention, in some embodiments, can comprise one or more rare earth oxides in an amount greater than 0.05 weight percent. In some embodiments, the one or more rare earth oxides can comprise at least one of $La_2O_3$, $CeO_2$, $Y_2O_3$ and $Sc_2O_3$. In some embodiments, the one or more rare earth oxides are present in an amount up to 10 weight percent. The one or more rare earth oxides are present in an amount between 2 and 10 weight percent in some embodiments. The one or more rare earth oxides, in some embodiments, are present in an amount between 5 and 10 weight percent.

In some embodiments, glass compositions of the present invention are substantially free of BaO. Glass compositions of the present invention, in some embodiments, comprise 0 to 0.05 weight percent BaO. In some embodiments, glass compositions of the present invention are substantially free of SrO. Glass compositions of the present invention, in some embodiments, comprise 0 to 0.05 weight percent SrO.

It should be understood that any component of a glass composition described as being present in amount between about 0 weight percent and another weight percent is not necessarily required in all embodiments. In other words, such components may be optional in some embodiments, depending of course on the amounts of other components included in the compositions. Likewise, in some embodiments, glass compositions can be substantially free of such components, meaning that any amount of the component present in the glass composition would result from the component being present as a trace impurity in a batch material and would only be present in amounts of about 0.05 weight percent or less.

Some embodiments of the present invention can be characterized by the amount of $SiO_2$ present in the glass compositions. $SiO_2$ can be present in an amount between 47 and 64 weight percent in some embodiments. $SiO_2$ can be present, in some embodiments, in an amount between 50 and 60 weight percent. In some embodiments, $SiO_2$ can be present in an amount between 52 and 58 weight percent.

Some embodiments of the present invention can be characterized by the amount of $Al_2O_3$ present in the glass compositions. In some embodiments, glass compositions can comprise 22 to 36 weight percent $Al_2O_3$. $Al_2O_3$ can be present, in some embodiments, in an amount between 24 and 36 weight percent. $Al_2O_3$ can be present in an amount between about 24 and 35 weight percent in some embodiments. In some embodiments, $Al_2O_3$ can be present in an amount of at least 24 weight percent.

Some embodiments of the present invention can be characterized by the amount of MgO present in the glass compositions. In some embodiments, glass compositions of the present invention comprise between 1 and 15 weight percent MgO. MgO can be present, in some embodiments, in an amount between 2 and 13 weight percent. MgO can be present in an amount between 3 and 12 weight percent in some embodiments.

Some embodiments of the present invention can be characterized by the amount of $Al_2O_3$ and MgO content ($Al_2O_3$+MgO content). In some embodiments, the $Al_2O_3$+MgO content is at least 25 weight percent. The $Al_2O_3$+MgO content, in some embodiments, can be between 26 weight percent and 50 weight percent. The $Al_2O_3$+MgO content can be between 28 weight percent and 44 weight percent in some embodiments.

Some embodiments of the present invention can be characterized by the amount of CaO present in the glass compositions. CaO can be present in an amount between 0.5 and 7 weight percent in some embodiments. CaO can be present, in some embodiments, in an amount between 0.5 and 4 weight percent. In some embodiments, CaO can be present in an amount between 1 and 7 weight percent. CaO can be present in an amount between 1 and 4 weight percent.

Some embodiments of the present invention can be characterized by the amount of CaO and MgO content (CaO+MgO content). In some embodiments, the CaO+MgO content is 18 weight percent or less. The CaO+MgO content, in some embodiments, can be less than 16 weight percent. The CaO+MgO content can be between 7 weight percent and 18 weight percent in some embodiments. In some embodiments, the CaO+MgO content can be between 7 weight percent and 16 weight percent. The CaO+MgO content, in some embodiments, is between 7 and 15 weight percent.

Some embodiments of the present invention can be characterized by the ratio of MgO to CaO. In some embodiments, the MgO/CaO ratio is at least 1.0. The MgO/CaO ratio in some embodiments of glass compositions is at least 1.5. The MgO/CaO ratio is at least 2.0 in some embodiments of glass compositions. In some embodiments, the MgO/CaO ratio is between 0.1 and 30. The MgO/CaO ratio in some embodiments of glass compositions is between 1.0 and 15. The MgO/CaO ratio is between 2.0 and 10 in some embodiments of glass compositions.

Some embodiments of the present invention can be characterized by the amount of $Na_2O$ present in the glass compositions. In some embodiments, glass compositions of the present invention can comprise between about 0 and about 2 weight percent $Na_2O$. $Na_2O$ can be present, in some embodiments, in an amount between about 0 and about 1.5 weight percent. In some embodiments, $Na_2O$ can be present in an amount between about 0 and about 1 weight percent.

Some embodiments of the present invention can be characterized by the amount of $K_2O$ present in the glass compositions. $K_2O$ can be present, in some embodiments, in an amount between about 0 and about 1 weight percent. In some embodiments, $K_2O$ can be present in an amount up to about 1 weight percent.

Some embodiments of the present invention can be characterized by the amount of $Li_2O$ present in the glass compositions. In some embodiments, glass compositions of the present invention can comprise between about 0 and about 5 weight percent $Li_2O$. $Li_2O$ can be present, in some embodiments, in an amount of about 3 weight percent or less. In some embodiments, $Li_2O$ can be present in an amount of about 1 or more weight percent. In some embodiments, $Li_2O$ can be present in an amount between about 1 and about 5 weight percent. $Li_2O$ can be present, in some embodiments, in an amount between about 1 and about 3 weight percent.

Some embodiments of the present invention can be characterized by the total amount of $Na_2O$, $K_2O$, and $Li_2O$ content. In some embodiments, the total $Na_2O$, $K_2O$, and $Li_2O$ content ($Na_2O+K_2O+Li_2O$) is less than 8 weight percent. In some embodiments, the total $Na_2O$, $K_2O$, and $Li_2O$ content ($Na_2O+K_2O+Li_2O$) is less than 4 percent. In some embodiments, the total $Na_2O$, $K_2O$, and $Li_2O$ content ($Na_2O+K_2O+Li_2O$) is less than 2 percent.

Some embodiments of the present invention can be characterized by the amount of $B_2O_3$ present in the glass compositions. $B_2O_3$ can be present in an amount between about 0 and about 3 weight percent in some embodiments. In some embodiments, $B_2O_3$ can be present in an amount between about 0 and about 2.1 weight percent. $B_2O_3$ can be present, in some embodiments, in an amount less than about 1 weight percent. In some embodiments, glass compositions of the present invention can be substantially free of $B_2O_3$, meaning that any $B_2O_3$ present in the glass composition would result from $B_2O_3$ being present as a trace impurity in a batch material. In some such embodiments, the amount of $B_2O_3$ content in the compositions is 0 to 0.05 weight percent.

Some embodiments of the present invention can be characterized by the amount of $Fe_2O_3$ present in the glass compositions. In some embodiments, $Fe_2O_3$ can be present in an amount less than 1.0 weight percent. $Fe_2O_3$ can be present, in some embodiments, in an amount between about 0 and about 0.5 weight percent. In some embodiments, $Fe_2O_3$ can be present in an amount up to about 0.4 weight percent.

Some embodiments of the present invention can be characterized by the amount of $TiO_2$ present in the glass compositions. $TiO_2$ can be present, in some embodiments, in an amount between about 0 and about 2 weight percent. In some embodiments, $TiO_2$ can be present in an amount up to about 2 weight percent. $TiO_2$ can be present in an amount up to about 1 weight percent in some embodiments.

In some embodiments, glass compositions of the present invention are substantially free of BaO. Glass compositions of the present invention, in some embodiments, comprise 0 to 0.05 weight percent BaO. In some embodiments, glass compositions of the present invention are substantially free of SrO. Glass compositions of the present invention, in some embodiments, comprise 0 to 0.05 weight percent SrO.

Some embodiments of the present invention can be characterized by the amount of $F_2$ present in the glass compositions. $F_2$ can be present, in some embodiments, in an amount between about 0 and about 2 weight percent. In some embodiments, $F_2$ can be present in an amount between about 0 and about 1. $F_2$ can be present in an amount less than about 0.1 weight percent in some embodiments.

In some embodiments, glass compositions of the present invention can comprise one or more rare earth oxides. As understood to those of skill in the art, the term "rare earth oxides" refers to oxides incorporating a rare earth metal and includes oxides of scandium ($Sc_2O_3$), yttrium ($Y_2O_3$), and the lanthanide elements (lanthanum ($La_2O_3$), cerium ($Ce_2O_3$ and $CeO_2$), praseodymium ($Pr_2O_3$), neodymium ($Nd_2O_3$), promethium ($Pm_2O_3$), samarium ($Sm_2O_3$), europium ($Eu_2O_3$ and EuO), gadolinium ($Gd_2O_3$), terbium ($Tb_2O_3$), dysprosium ($Dy_2O_3$), holmium ($Ho_2O_3$), erbium ($Er_2O_3$), thulium ($Tm_2O_3$), ytterbium ($Yb_2O_3$), and lutetium ($Lu_2O_3$)). In some embodiments, the one or more rare earth oxides comprise at least one of $La_2O_3$, $CeO_2$, $Y_2O_3$ and $Sc_2O_3$.

The one or more rare earth oxides can be included in some embodiments of glass compositions of the present invention in amounts that exceed those wherein the rare earth oxide is present only as a tramp material or impurity in a batch material included with a glass batch to provide another component. The glass compositions, in some embodiments, can comprise a combination of rare earth oxides (e.g., one or more of various rare earth oxides).

In some embodiments, one or more rare earth oxides can be present in a glass composition in an amount greater than about 0.05 weight percent. The one or more rare earth oxides can be present in an amount greater than about 0.5 weight percent in some embodiments. In some embodiments, the one or more rare earth oxides can be present in an amount up to about 10 weight percent although greater amounts can be used in other embodiments. The one or more rare earth oxides, in some embodiments, can be present in an amount between about 0.05 and about 10 weight percent. The one or more rare earth oxides can be present in an amount between about 0.5 and about 10 weight percent in some embodiments. In some embodiments, the one or more rare earth oxides can be present in an amount between about 2.0 and about 10 weight percent. The one or more rare earth oxides, in some embodiments, can be present in an amount greater than about 3.0 and about 10 weight percent. In some embodiments, the one or more rare earth oxides can be present in an amount between about 4.0 and about 10 weight percent. The one or more rare earth oxides can be present in an amount between about 5.0 and about 10 weight percent in some embodiments.

Sulfate (expressed as $SO_3$) may also be present as a refining agent. Small amounts of impurities may also be present from raw materials or from contamination during the melting processes, such as SrO, BaO, $Cl_2$, $P_2O_5$, $Cr_2O_3$, or NiO (not limited to these particular chemical forms). Other refining agents and/or processing aids may also be present such as $As_2O_3$, $MnO_2$, $Sb_2O_3$, $SnO_2$, ZnO or $CeO_2$ (not limited to these particular chemical forms). These impurities and refining agents, when present, are each typically present in amounts less than 0.5% by weight of the total glass composition.

As noted above, glass compositions, according to some embodiments of the present invention are fiberizable. In some embodiments, glass compositions of the present invention have forming temperatures ($T_F$) desirable for use in commercial fiber glass manufacturing operations. As used herein, the term "forming temperature" or $T_F$, means the temperature at which the glass composition has a viscosity of 1000 poise (or "log 3 temperature"). Glass compositions of the present invention, in some embodiments, have a forming temperature ($T_F$) ranging from about 1220° C. to about 1510° C. In another embodiment, glass compositions of the present invention have a forming temperature ranging from about 1240° C. to about 1450° C. In some embodiments, glass compositions have a forming temperature ranging from about 1250° C. to about 1400° C.

Glass compositions of the present invention, in some embodiments, have a liquidus temperature ranging from about 1210° C. to about 1530° C. In another embodiment, glass compositions of the present invention have a liquidus temperature ranging from about 1250° C. to about 1450° C. In some embodiments, glass compositions of the present invention have a liquidus temperature ranging from about 1260° C. to about 1400° C.

In some embodiments, the difference between the forming temperature and the liquidus temperature of a glass composition of the present invention is desirable for commercial fiber glass manufacturing operations. For example, for some embodiments of glass compositions, the difference between the forming temperature and the liquidus temperature ranges from about 35° C. to greater than 60° C. In some embodiments, the difference between the forming temperature and the liquidus temperature of a glass composition of the present invention is at least 50° C.

As provided herein, glass fibers can be formed from some embodiments of the glass compositions of the present invention. Thus, embodiments of the present invention can comprise glass fibers formed from any of the glass compositions described herein. In some embodiments, the glass fibers may be arranged into a fabric. In some embodiments, glass fibers of the present invention can be provided in other forms including, for example and without limitation, as continuous strands, chopped strands (dry or wet), yarns, rovings, prepregs, etc. In short, various embodiments of the glass compositions (and any fibers formed therefrom) can be used in a variety of applications.

Glass fibers of the present invention can be prepared in the conventional manner well known in the art, by blending the raw materials used to supply the specific oxides that form the composition of the fibers. Glass fibers according to the various embodiments of the present invention can be formed using any process known in the art for forming glass fibers, and more desirably, any process known in the art for forming essentially continuous glass fibers. For example, although not limiting herein, the glass fibers according to non-limiting embodiments of the present invention can be formed using direct-melt or indirect-melt fiber forming methods. These methods are well known in the art and further discussion thereof is not believed to be necessary in view of the present disclosure. See, e.g., K. L. Loewenstein, *The Manufacturing Technology of Continuous Glass Fibers,* 3rd Ed., Elsevier, N.Y., 1993 at pages 47-48 and 117-234.

Some embodiments of the present invention relate to fiber glass strands. Some embodiments of the present invention relate to yarns comprising fiber glass strands. Some embodiments of yarns of the present invention are particularly suitable for weaving applications. In addition, some embodiments of the present invention relate to glass fiber fabrics. Some embodiments of fiber glass fabrics of the present invention are particularly suitable for use in reinforcement applications, especially reinforcement applications in which high modulus, high strength, and/or high elongation are important. Further, some embodiments of the present invention relate to composites that incorporate fiber glass strands, fiber glass yarns, and fiber glass fabrics, such as fiber reinforced polymer composites. Still further, some embodiments of the present invention relate to fiber reinforced composites for applications, including, but not limited to wind energy, automotive, safety/security, aerospace, aviation, high pressure tanks Some embodiments of the present invention relate to printed circuit boards where lower coefficients of thermal expansion are particularly desirable such as substrates for chip packaging.

Some embodiments of the present invention relate to fiber glass strands. In some embodiments, a fiber glass strand of the present invention comprises a plurality of glass fibers comprising a glass composition that comprises the following components:

$SiO_2$ 47-64 weight percent;
$Al_2O_3$ 22-36 weight percent;
MgO 1-15 weight percent;
CaO 0.5-7 weight percent;
$Na_2O$ 0-2 weight percent;
$K_2O$ 0-1 weight percent;
$Li_2O$ 0-5 weight percent;
$B_2O_3$ 0-3 weight percent;
$Fe_2O_3$ 0-1 weight percent;
$F_2$ 0-2 weight percent;
$TiO_2$ 0-2 weight percent;
ZnO 0-3 weight percent;
BaO 0-6.5 weight percent and
other constituents 0-8 weight percent total.

In some embodiments, a fiber glass strand of the present invention comprises a plurality of glass fibers comprising a glass composition that comprises the following components:

$SiO_2$ 50-60 weight percent;
$Al_2O_3$ 24-36 weight percent;
MgO 2-12 weight percent;
CaO 1-4 weight percent;
$Na_2O$ 0-2 weight percent;
$K_2O$ 0-1 weight percent;
$Li_2O$ 0-5 weight percent;
$B_2O_3$ 0-3 weight percent;
$Fe_2O_3$ 0-1 weight percent;
$F_2$ 0-2 weight percent;
$TiO_2$ 0-2 weight percent;
ZnO 0-2 weight percent;
BaO 0-5 weight percent; and
other constituents 0-8 weight percent total.

A number of other glass compositions are disclosed herein as part of the present invention, and other embodiments of the present invention relate to fiber glass strands formed from such compositions.

In some embodiments, glass fibers of the present invention can exhibit desirable mechanical and other properties. Glass fibers of the present invention, in some embodiments, can exhibit one or more improved mechanical properties relative to glass fibers formed from E-glass. Examples of desirable properties exhibited by some embodiments of glass fibers of the present invention include, without limitation, tensile strength, Young's modulus, coefficient of thermal expansion, softening point, elongation, transition temperature and dielectric constant.

Glass fibers of the present invention can have desirable Young's modulus (E) values in some embodiments. In some embodiments, fibers formed from glass compositions of the present invention can have a Young's modulus greater than about 87 GPa. In some embodiments, glass fibers of the present invention can have a Young's modulus greater than about 90 GPa. Fibers formed from glass compositions of the present invention can have a Young's modulus greater than about 92 GPa in some embodiments. In some embodiments, glass fibers of the present invention can have a Young's modulus greater than about 93 GPa. Glass fibers of the present invention can have a Young's modulus greater than about 95 GPa in some embodiments. Unless otherwise stated herein, Young's modulus values discussed herein are determined using the procedure set forth in the Examples section below.

Fiber glass strands can comprise glass fibers of various diameters, depending on the desired application. In some embodiments, a fiber glass strand of the present invention comprises at least one glass fiber having a diameter between about 5 and about 24 μm. In other embodiments, the at least one glass fiber has a diameter between about 5 and about 10 μm.

In some embodiments, fiber glass strands of the present invention can be formed into yarn and rovings. Rovings can comprise assembled, multi-end, or single-end direct draw rovings. Rovings comprising fiber glass strands of the present invention can comprise direct draw single-end rovings having various diameters and densities, depending on the desired application. In some embodiments, a roving comprising fiber glass strands of the present invention exhibits a density up to about 113 yards/pound.

Some embodiments of the present invention relate to yarns comprising at least one fiber glass strand as disclosed herein.

In some embodiments, a yarn of the present invention comprises at least one fiber glass strand as disclosed herein, wherein the at least one fiber glass strand is at least partially coated with a sizing composition. In some embodiments, the sizing composition is compatible with a thermosetting polymeric resin. In other embodiments, the sizing composition can comprise a starch-oil sizing composition.

Yarns can have various linear mass densities, depending on the desired application. In some embodiments, a yarn of the present invention has a linear mass density from about 5,000 yards/pound to about 10,000 yards/pound.

Yarns can have various twist levels and directions, depending on the desired application. In some embodiments, a yarn of the present invention has a twist in the z direction of about 0.5 to about 2 turns per inch. In other embodiments, a yarn of the present invention has a twist in the z direction of about 0.7 turns per inch.

Yarns can be made from one or more strands that are twisted together and/or plied, depending on the desired application. Yarns can be made from one or more strands that are twisted together but not plied; such yarns are known as "singles." Yarns of the present invention can be made from one or more strands that are twisted together but not plied. In some embodiments, yarns of the present invention comprise 1-4 strands twisted together. In other embodiments, yarns of the present invention comprise 1 twisted strand.

Some embodiments of the present invention relate to fabrics comprising at least one fiber glass strand. In some embodiments, a fabric of the present invention can comprise at least one fiber glass strand comprising one of the other glass compositions disclosed herein as part of the present invention. In some embodiments, a fabric of the present invention comprises a yarn as disclosed herein. Fabrics of the present invention, in some embodiments, can comprise at least one fill yarn comprising at least one fiber glass strand as disclosed herein. Fabrics of the present invention, in some embodiments, can comprise at least one warp yarn comprising at least one fiber glass strand as disclosed herein. In some embodiments, a fabric of the present invention comprises at least one fill yarn comprising at least one fiber glass strand as disclosed herein and at least one warp yarn comprising at least one fiber glass strand as disclosed herein.

In some embodiments of the present invention comprising a fabric, the glass fiber fabric is a fabric woven in accordance with industrial fabric style no. 7781. In other embodiments, the fabric comprises a plain weave fabric, a twill fabric, a crowfoot fabric, a satin weave fabric, a stitch bonded fabric (also known as a non-crimp fabric), or a "three-dimensional" woven fabric.

Some embodiments of the present invention relate to composites. In some embodiments, a composite of the present invention comprises a polymeric resin and a plurality of glass fibers disposed in the polymeric resin, wherein at least one of the plurality of glass fibers comprises any of the glass compositions disclosed herein as part of the present invention. In some embodiments, a composite of the present invention comprises a polymeric resin and at least one fiber glass strand as disclosed herein disposed in the polymeric resin. In some embodiments, a composite of the present invention comprises a polymeric resin and at least a portion of a roving comprising at least one fiber glass strand as disclosed herein disposed in the polymeric resin. In other embodiments, a composite of the present invention comprises a polymeric resin and at least one yarn as disclosed herein disposed in the polymeric resin. In still other embodiments, a composite of the present invention comprises a polymeric resin and at least one fabric as disclosed herein disposed in the polymeric resin. In some embodiments, a composite of the present invention comprises at least one fill yarn comprising at least one fiber glass strand as disclosed herein and at least one warp yarn comprising at least one fiber glass strand as disclosed herein.

Composites of the present invention can comprise various polymeric resins, depending on the desired properties and applications. In some embodiments of the present invention comprising a composite, the polymeric resin comprises an epoxy resin. In other embodiments of the present invention comprising a composite, the polymeric resin can comprise polyethylene, polypropylene, polyamide, polyimide, polybutylene terephthalate, polycarbonate, thermoplastic polyurethane, phenolic, polyester, vinyl ester, polydicyclopentadiene, polyphenylene sulfide, polyether ether ketone, cyanate esters, bis-maleimides, and thermoset polyurethane resins.

The invention will be illustrated through the following series of specific embodiments. However, it will be understood by one of skill in the art that many other embodiments are contemplated by the principles of the invention.

EXAMPLES

Table 1 provides a plurality of fiberizable glass compositions according to various embodiments of the present invention as well as data relating to various properties of such compositions.

The glasses in these examples were made by melting mixtures of commercial and reagent grade chemicals (reagent grade chemicals were used only for the rare earth oxides) in powder form in 10% Rh/Pt crucibles at the temperatures between 1500° C. and 1650° C. (2732° F.-3002° F.) for four hours. Each batch was about 1000 grams. After the 4 hour melting period, the molten glass was poured onto a steel plate for quenching. Volatile species, such as fluoride and alkali oxides, were not adjusted in the batches for their emission loss because of their low concentrations in the glasses. The compositions in the examples represent as-batched compositions. Commercial ingredients were used in preparing the glasses. In the batch calculation, special raw material retention factors were considered to calculate the oxides in each glass. The retention factors are based on years of glass batch melting and oxides yield in the glass as measured. Hence, the as-batched compositions illustrated in the examples are considered to be close to the measured compositions.

TABLE 1

|  | 1 | 2 | 3 | 4 | 5 | 6 |
|---|---|---|---|---|---|---|
| $SiO_2$ | 54.84 | 56.92 | 58.57 | 57.94 | 59.55 | 59.22 |
| $Al_2O_3$ | 26.93 | 23.92 | 24.07 | 23.81 | 24.47 | 24.34 |
| $Fe_2O_3$ | 0.39 | 0.38 | 0.36 | 0.36 | 0.36 | 0.36 |
| CaO | 2.02 | 1.49 | 2.47 | 3.50 | 3.60 | 3.58 |
| MgO | 12.50 | 14.99 | 13.88 | 13.74 | 11.36 | 11.29 |

TABLE 1-continued

|   | | | | | | |
|---|---|---|---|---|---|---|
| Na$_2$O | 0.06 | 0.06 | 0.06 | 0.06 | 0.06 | 0.06 |
| K$_2$O | 0.14 | 0.13 | 0.13 | 0.13 | 0.13 | 0.13 |
| B$_2$O$_3$ | 2.00 | 1.07 | 0.00 | 0.00 | 0.00 | 0.56 |
| F$_2$ | 0.61 | 0.60 | 0.01 | 0.01 | 0.01 | 0.01 |
| TiO$_2$ | 0.50 | 0.44 | 0.44 | 0.44 | 0.45 | 0.45 |
| Li$_2$O | 0.00 | 0.00 | 0.00 | 0.00 | 0.00 | 0.00 |
| ZrO$_2$ | 0.01 | 0.01 | 0.00 | 0.00 | 0.00 | 0.00 |
| ZnO | 0.00 | 0.00 | 0.00 | 0.00 | 0.00 | 0.00 |
| BaO | 0.00 | 0.00 | 0.00 | 0.00 | 0.00 | 0.00 |
| La$_2$O$_3$ | 0.00 | 0.00 | 0.00 | 0.00 | 0.00 | 0.00 |
| TOTAL | 100.00 | 100.00 | 100.00 | 100.00 | 100.00 | 100.00 |
| Al$_2$O$_3$/SiO$_2$ | 0.49 | 0.42 | 0.41 | 0.41 | 0.41 | 0.41 |
| Al$_2$O$_3$/RO | 1.86 | 1.45 | 1.47 | 1.38 | 1.64 | 1.64 |
| CaO/MgO | 0.16 | 0.10 | 0.18 | 0.25 | 0.32 | 0.32 |
| Al$_2$O$_3$ + SiO$_2$ | 81.77 | 80.84 | 82.64 | 81.76 | 84.02 | 83.55 |
| RO/MgO | 1.16 | 1.10 | 1.18 | 1.25 | 1.32 | 1.32 |
| MgO + CaO | 14.52 | 16.48 | 16.35 | 17.24 | 14.95 | 14.87 |
| T$_m$ (° C.) | 1476 | 1590 | 1500 | 1489 | 1544 | 1538 |
| T$_F$ (° C.) | 1298 | 1391 | 1320 | 1310 | 1358 | 1349 |
| T$_L$ (° C.) | 1261 | 1334 | 1357 | 1345 | 1354 | 1348 |
| ΔT (° C.) | 37 | 57 | −37 | −35 | 4 | 1 |
| Fiber Density (g/cm$^3$) | — | 2.506 | 2.588 | 2.595 | 2.539 | 2.533 |
| Fiber Strength (MPa) | — | — | — | — | — | — |
| Fiber Modulus (GPa) | — | — | 94.9 | 94.58 | — | — |
| Specific Fiber Modulus (×10$^6$ m) | — | — | 3.74 | 3.82 | — | — |

| | 7 | 8 | 9 | 10 | 11 | 12 |
|---|---|---|---|---|---|---|
| SiO$_2$ | 60.15 | 48.41 | 63.91 | 50.40 | 51.32 | 51.12 |
| Al$_2$O$_3$ | 25.02 | 30.76 | 25.11 | 34.15 | 34.78 | 35.38 |
| Fe$_2$O$_3$ | 0.34 | 0.41 | 0.37 | 0.44 | 0.45 | 0.46 |
| CaO | 6.53 | 3.51 | 3.15 | 2.59 | 1.66 | 1.53 |
| MgO | 6.31 | 12.85 | 4.79 | 7.58 | 7.71 | 6.45 |
| Na$_2$O | 0.09 | 0.11 | 1.07 | 0.96 | 0.13 | 0.42 |
| K$_2$O | 0.16 | 0.19 | 0.14 | 0.22 | 0.22 | 0.22 |
| B$_2$O$_3$ | 0.00 | 2.06 | 0.97 | 1.59 | 1.62 | 2.42 |
| F$_2$ | 0.01 | 0.01 | 0.01 | 0.02 | 0.02 | 0.02 |
| TiO$_2$ | 0.40 | 0.50 | 0.46 | 0.54 | 0.55 | 0.57 |
| Li$_2$O | 0.99 | 1.16 | 0.00 | 1.50 | 1.52 | 1.40 |
| ZrO$_2$ | 0.00 | 0.02 | 0.00 | 0.02 | 0.02 | 0.02 |
| ZnO | 0.00 | 0.00 | 0.00 | 0.00 | 0.00 | 0.00 |
| BaO | 0.00 | 0.00 | 0.00 | 0.00 | 0.00 | 0.00 |
| La$_2$O$_3$ | 0.00 | 0.00 | 0.00 | 0.00 | 0.00 | 0.00 |
| TOTAL | 100.00 | 100.00 | 100.00 | 100.00 | 100.00 | 100.00 |
| Al$_2$O$_3$/SiO$_2$ | 0.42 | 0.64 | 0.39 | 0.68 | 0.68 | 0.69 |
| Al$_2$O$_3$/RO | 1.95 | 1.88 | 3.16 | 3.36 | 3.71 | 4.44 |
| CaO/MgO | 1.04 | 0.27 | 0.66 | 0.34 | 0.22 | 0.24 |
| Al$_2$O$_3$ + SiO$_2$ | 85.16 | 79.17 | 89.02 | 84.54 | 86.10 | 86.50 |
| RO/MgO | 2.04 | 1.27 | 1.66 | 1.34 | 1.22 | 1.24 |
| MgO + CaO | 12.84 | 16.36 | 7.94 | 10.18 | 9.37 | 7.98 |
| T$_m$ (° C.) | 1565 | 1384 | 1694 | 1457 | 1492 | 1529 |
| T$_F$ (° C.) | 1363 | 1222 | 1474 | 1389 | 1460 | 1490 |
| T$_L$ (° C.) | 1300 | 1361 | 1419 | 1444 | 1481 | 1515 |
| ΔT (° C.) | 63 | −139 | 55 | −55 | −21 | −25 |
| Fiber Density (g/cm$^3$) | 2.529 | 2.610 | 2.549 | 2.570 | 2.565 | 2.551 |
| Fiber Strength (MPa) | — | — | — | — | — | — |
| Fiber Modulus (GPa) | — | 103.69 | 87.57 | 95.01 | 96.01 | 94.94 |
| Specific Fiber Modulus (×10$^6$ m) | — | 4.05 | 3.51 | 3.77 | 3.82 | 3.80 |

| | 13 | 14 | 15 | 16 | 17 | 18 |
|---|---|---|---|---|---|---|
| SiO$_2$ | 55.11 | 58.09 | 59.19 | 55.16 | 54.15 | 52.66 |
| Al$_2$O$_3$ | 32.76 | 29.65 | 29.71 | 32.54 | 30.42 | 29.57 |
| Fe$_2$O$_3$ | 0.44 | 0.40 | 0.38 | 0.42 | 0.31 | 0.31 |
| CaO | 0.86 | 1.57 | 1.47 | 1.50 | 0.97 | 3.68 |
| MgO | 6.38 | 7.14 | 6.65 | 6.55 | 8.22 | 8.02 |
| Na$_2$O | 0.39 | 0.40 | 0.40 | 0.41 | 0.21 | 0.20 |
| K$_2$O | 0.20 | 0.18 | 0.19 | 0.21 | 0.25 | 0.25 |
| B$_2$O$_3$ | 2.34 | 1.06 | 0.00 | 1.21 | 0.99 | 0.96 |
| F$_2$ | 0.02 | 0.01 | 0.01 | 0.01 | 0.01 | 0.01 |

TABLE 1-continued

|  |  |  |  |  |  |  |
|---|---|---|---|---|---|---|
| $TiO_2$ | 0.55 | 0.49 | 0.46 | 0.51 | 0.32 | 0.31 |
| $Li_2O$ | 0.94 | 1.01 | 1.52 | 1.46 | 4.08 | 3.96 |
| $ZrO_2$ | 0.01 | 0.02 | 0.02 | 0.02 | 0.07 | 0.07 |
| ZnO | 0.00 | 0.00 | 0.00 | 0.00 | 0.00 | 0.00 |
| BaO | 0.00 | 0.00 | 0.00 | 0.00 | 0.00 | 0.00 |
| $La_2O_3$ | 0.00 | 0.00 | 0.00 | 0.00 | 0.00 | 0.00 |
| TOTAL | 100.00 | 100.00 | 100.00 | 100.00 | 100.00 | 100.00 |
| $Al_2O_3/SiO_2$ | 0.59 | 0.51 | 0.50 | 0.59 | 0.56 | 0.56 |
| $Al_2O_3$/RO | 4.52 | 3.41 | 3.66 | 4.04 | 3.31 | 2.53 |
| CaO/MgO | 0.13 | 0.22 | 0.22 | 0.23 | 0.12 | 0.46 |
| $Al_2O_3 + SiO_2$ | 87.87 | 87.74 | 88.90 | 87.70 | 84.58 | 82.23 |
| RO/MgO | 1.13 | 1.22 | 1.22 | 1.23 | 1.12 | 1.46 |
| MgO + CaO | 7.24 | 8.70 | 8.12 | 8.05 | 9.19 | 11.70 |
| $T_m$ (° C.) | 1540 | 1589 | 1579 | 1503 | 1438 | 1436 |
| $T_F$ (° C.) | 1506 | 1402 | 1402 | 1455 | 1242 | 1240 |
| $T_L$ (° C.) | 1524 | 1453 | 1447 | 1482 | 1308 | — |
| ΔT (° C.) | −18 | −51 | −45 | −27 | −66 | — |
| Fiber Density (g/cm³) | 2.519 | 2.517 | 2.515 | 2.531 | 2.529 | 2.535 |
| Fiber Strength (MPa) | — | — | — | — | — | — |
| Fiber Modulus (GPa) | 92.89 | 92.71 | 92.95 | 94.52 | 93.17 | 93.66 |
| Specific Fiber Modulus (×10⁶ m) | 3.76 | 3.76 | 3.77 | 3.81 | 3.76 | 3.77 |

|  | 19 | 20 | 21 | 22 | 23 | 24 |
|---|---|---|---|---|---|---|
| $SiO_2$ | 53.92 | 53.88 | 55.25 | 51.85 | 50.43 | 50.58 |
| $Al_2O_3$ | 34.92 | 29.76 | 28.34 | 26.30 | 22.14 | 28.37 |
| $Fe_2O_3$ | 0.41 | 0.32 | 0.32 | 0.29 | 0.27 | 0.41 |
| CaO | 2.73 | 3.30 | 3.36 | 3.12 | 3.51 | 3.88 |
| MgO | 3.58 | 2.97 | 1.99 | 1.89 | 6.55 | 1.75 |
| $Na_2O$ | 0.18 | 0.19 | 0.17 | 0.75 | 0.78 | 0.96 |
| $K_2O$ | 0.25 | 0.25 | 0.25 | 0.23 | 0.23 | 0.23 |
| $B_2O_3$ | 0.57 | 0.69 | 0.70 | 0.57 | 0.65 | 0.00 |
| $F_2$ | 0.01 | 0.01 | 0.01 | 0.01 | 0.01 | 0.01 |
| $TiO_2$ | 0.47 | 0.34 | 0.34 | 0.31 | 0.30 | 0.52 |
| $Li_2O$ | 2.91 | 3.52 | 3.03 | 2.89 | 1.85 | 0.00 |
| $ZrO_2$ | 0.05 | 0.06 | 0.06 | 0.06 | 0.06 | 0.06 |
| ZnO | 0.00 | 0.00 | 0.00 | 0.00 | 0.00 | 0.00 |
| BaO | 0.00 | 4.70 | 6.17 | 5.24 | 5.92 | 5.98 |
| $La_2O_3$ | 0.00 | 0.00 | 0.00 | 6.48 | 7.32 | 7.25 |
| TOTAL | 100.00 | 100.00 | 100.00 | 100.00 | 100.00 | 100.00 |
| $Al_2O_3/SiO_2$ | 0.65 | 0.55 | 0.51 | 0.51 | 0.44 | 0.56 |
| $Al_2O_3$/RO | 5.54 | 4.75 | 5.29 | 5.25 | 2.20 | 5.04 |
| CaO/MgO | 0.76 | 1.11 | 1.69 | 1.65 | 0.54 | 2.22 |
| $Al_2O_3 + SiO_2$ | 88.85 | 83.65 | 83.60 | 78.15 | 72.57 | 78.95 |
| RO/MgO | 1.76 | 2.11 | 2.69 | 2.65 | 1.54 | 3.22 |
| MgO + CaO | 6.30 | 6.27 | 5.36 | 5.01 | 10.05 | 5.63 |
| $T_m$ (° C.) | 1512 | 1530 | 1582 | 1530 | 1464 | 1574 |
| $T_F$ (° C.) | 1441 | 1321 | 1365 | 1319 | 1266 | 1410 |
| $T_L$ (° C.) | 1360 | 1314 | 1328 | 1210 | 1226 | 1400 |
| ΔT (° C.) | 81 | 7 | 37 | 109 | 40 | 10 |
| Fiber Density (g/cm³) | 2.516 | — | — | 2.681 | 2.776 | — |
| Fiber Strength (MPa) | — | — | — | — | — | — |
| Fiber Modulus (GPa) | 89.50 | — | — | 87.45 | 90.54 | — |
| Specific Fiber Modulus (×10⁶ m) | 3.63 | — | — | 3.33 | 3.33 | — |

|  | 25 | 26 | 27 | 28 | 29 |
|---|---|---|---|---|---|
| $SiO_2$ | 51.35 | 52.05 | 53.02 | 48.44 | 47.26 |
| $Al_2O_3$ | 27.43 | 26.91 | 27.41 | 28.82 | 29.22 |
| $Fe_2O_3$ | 0.40 | 0.36 | 0.36 | 0.38 | 0.37 |
| CaO | 2.95 | 0.64 | 0.65 | 1.36 | 2.07 |
| MgO | 5.06 | 3.52 | 2.18 | 2.39 | 1.94 |
| $Na_2O$ | 0.64 | 0.10 | 0.10 | 0.11 | 0.13 |
| $K_2O$ | 0.23 | 0.23 | 0.23 | 0.00 | 0.00 |
| $B_2O_3$ | 0.00 | 0.67 | 0.69 | 1.44 | 2.21 |
| $F_2$ | 0.01 | 0.01 | 0.01 | 0.00 | 0.00 |
| $TiO_2$ | 0.51 | 0.44 | 0.45 | 0.47 | 0.45 |
| $Li_2O$ | 0.00 | 0.94 | 096 | 1.00 | 1.42 |
| $ZrO_2$ | 0.06 | 0.06 | 0.06 | 0.00 | 0.00 |
| ZnO | 0.00 | 0.92 | 2.35 | 2.47 | 2.36 |

TABLE 1-continued

|  | | | | | |
|---|---|---|---|---|---|
| BaO | 5.78 | 5.54 | 5.17 | 5.44 | 5.20 |
| $La_2O_3$ | 5.58 | 7.62 | 6.37 | 7.68 | 7.35 |
| TOTAL | 100.00 | 100.00 | 100.00 | 100.00 | 100.00 |
| $Al_2O_3/SiO_2$ | 0.53 | 0.52 | 0.52 | 0.59 | 0.62 |
| $Al_2O_3$/RO | 3.43 | 6.47 | 9.69 | 7.69 | 7.28 |
| CaO/MgO | 0.58 | 0.18 | 0.30 | 0.57 | 1.07 |
| $Al_2O_3 + SiO_2$ | 78.79 | 78.95 | 80.43 | 77.25 | 76.48 |
| RO/MgO | 1.58 | 1.18 | 1.30 | 1.57 | 2.07 |
| MgO + CaO | 8.01 | 4.16 | 2.83 | 3.75 | 4.01 |
| $T_m$ (° C.) | 1554 | 1601 | 1590 | 1491 | 1467 |
| $T_F$ (° C.) | 1367 | 1388 | 1398 | 1406 | 1355 |
| $T_L$ (° C.) | 1360 | 1380 | 1380 | 1381 | 1326 |
| $\Delta T$ (° C.) | 7 | 8 | 18 | 25 | 29 |
| Fiber Density (g/cm³) | — | — | — | — | — |
| Fiber Strength (MPa) | — | — | — | — | — |
| Fiber Modulus (GPa) | — | — | — | — | — |
| Specific Fiber Modulus (×10⁶ m) | — | — | — | — | — |

Melt Properties

Melt viscosity as a function of temperature and liquidus temperature was determined by using ASTM Test Method C965 "Standard Practice for Measuring Viscosity of Glass Above the Softening Point," and C829 "Standard Practices for Measurement of Liquidus Temperature of Glass by the Gradient Furnace Method," respectively.

Table 1 includes measured liquidus temperature ($T_L$), reference temperature of forming ($T_F$) defined by melt viscosity of 1000 Poise, and reference temperature of melting ($T_M$) defined by viscosity of 100 Poise, for the glass compositions. The difference between the forming temperature and the liquidus temperature ($\Delta T$) is also shown.

Mechanical Properties

For fiber tensile strength test, fiber samples from the glass compositions were produced from a 10 Rh/90 Pt single tip fiber drawing unit. Approximately, 85 grams of cullet of a given composition was fed into the bushing melting unit and conditioned at a temperature close or equal to the 100 Poise melt viscosity for two hours. The melt was subsequently lowered to a temperature close or equal to the 1000 Poise melt viscosity and stabilized for one hour prior to fiber drawing. Fiber diameter was controlled to produce an approximately 10 μm diameter fiber by controlling the speed of the fiber drawing winder. All fiber samples were captured in air without any contact with foreign objects. The fiber drawing was completed in a room with a controlled humidity of between 40 and 45% RH.

Young's modulus was also measured for certain glass compositions in Attachment A using the following technique. Approximately 50 grams of glass cullet having a composition corresponding to the appropriate example in Table 1 was re-melted in a 90 Pt/10 Rh crucible for two hours at a melting temperature defined by 100 Poise. The crucible was subsequently transferred into a vertical tube, electrically heated furnace. The furnace temperature was preset at a fiber pulling temperature close or equal to a 1000 Poise melt viscosity. The glass was equilibrated at the temperature for one hour before fiber drawing. The top of the fiber drawing furnace had a cover with a center hole, above which a water-cooled copper coil was mounted to regulate the fiber cooling. A silica rod was then manually dipped into the melt through the cooling coil, and a fiber about 1-1.5 m long was drawn out and collected. The diameter of the fiber ranged from 100 μm at one end to 1000 μm at the other end.

Elastic moduli were determined using an ultrasonic acoustic pulse technique (Panatherm 5010 unit from Panametrics, Inc. of Waltham, Mass.) for the fibers drawn from the glass melts. Extensional wave reflection time was obtained using twenty micro-second duration, 200 kHz pulses. The sample length was measured and the respective extensional wave velocity ($V_E$) was calculated. Fiber density (ρ) was measured using a Micromeritics AccuPyc 1330 pycnometer. About 20 measurements were made for each composition and the average Young's modulus (E) was calculated from the following formula:

$$E = V_E^2 \times \rho$$

The modulus tester uses a wave guide with a diameter of 1 mm, which sets the fiber diameter at the contact side with the wave guide to be about the same as the wave guide diameter. In other words, the end of the fiber having a diameter of 1000 μm was connected at the contact side of the wave guide. Fibers with various diameters were tested for Young's modulus and the results show that a fiber diameter from 100 to 1000 μm does not affect fiber modulus. Specific modulus values were calculated by dividing the Young's modulus values by the corresponding densities.

It is to be understood that the present description illustrates aspects of the invention relevant to a clear understanding of the invention. Certain aspects of the invention that would be apparent to those of ordinary skill in the art and that, therefore, would not facilitate a better understanding of the invention have not been presented in order to simplify the present description. Although the present invention has been described in connection with certain embodiments, the present invention is not limited to the particular embodiments disclosed, but is intended to cover modifications that are within the spirit and scope of the invention.

That which is claimed is:

1. A glass composition suitable for fiber forming comprising:
   $SiO_2$ 50-60 weight percent;
   $Al_2O_3$ 24-35 weight percent;
   MgO 2-12 weight percent;
   CaO 0.5-7 weight percent;
   $Na_2O$ 0-2 weight percent;
   $K_2O$ 0-1 weight percent;
   $Li_2O$ 1-3 weight percent;
   $B_2O_3$ 0-3 weight percent;

$Fe_2O_3$ 0-1 weight percent;
$F_2$ 0-2 weight percent;
$TiO_2$ 0-2 weight percent;
ZnO 0-3 weight percent;
BaO 0-6.5 weight percent; and
other constituents 0-8 weight percent total,
wherein the composition has a forming temperature ($T_F$) of at least 1250° C.

2. The composition of claim 1, wherein the $Al_2O_3$+MgO content is at least 30 weight percent.

3. The composition of claim 1, wherein the $B_2O_3$ content is less than 2.1 weight percent.

4. The composition of claim 1 wherein the CaO content is less than 4 weight percent.

5. The composition of claim 1, wherein the MgO+CaO content is less than 16 weight percent.

6. The composition of claim 1 wherein:
the $Na_2O$ content is 0-1 weight percent; and
the $Li_2O$ content is 1-3 weight percent.

7. The composition of claim 1 further comprising: at least one rare earth oxide in an amount greater than about 0.05 weight percent.

8. The composition of claim 7 wherein the one or more rare earth oxides are present in an amount up to about 8 weight percent.

9. The composition of claim 8, wherein the one or more rare earth oxides comprise at least one of $La_2O_3$, $CeO_2$, $Y_2O_3$ and $Sc_2O_3$.

10. A glass composition suitable for fiber forming comprising:
$SiO_2$ 47-64 weight percent;
$Al_2O_3$ 24-36 weight percent;
MgO 2-12 weight percent;
CaO 1-4 weight percent;
$Na_2O$ 0-2 weight percent;
$K_2O$ 0-1 weight percent;
$Li_2O$ 1-3 weight percent;
$B_2O_3$ 0-3 weight percent;
$Fe_2O_3$ 0-1 weight percent;
$F_2$ 0-2 weight percent;
$TiO_2$ 0-2 weight percent;
ZnO 0-2 weight percent;
BaO 0-5 weight percent; and
other constituents 0-8 weight percent total.

11. The composition of claim 10 wherein the $Na_2O$ content is 0-1 weight percent and the $Li_2O$ content is 1 or more weight percent.

12. The composition of claim 10 wherein the composition is substantially free of BaO.

13. The composition of claim 10, wherein:
the $Al_2O_3$ content is 24-35 weight percent; and
the $Al_2O_3$+MgO content is at least 30 weight percent.

14. The composition of claim 13 wherein the $B_2O_3$ content is less than 2.1 weight percent.

15. The composition of claim 13 wherein the MgO+CaO content is greater than 7 weight percent.

16. The composition of claim 10, wherein the glass composition comprises one or more rare earth oxides in an amount greater than about 0.05 weight percent.

17. The composition of claim 16, wherein the one or more rare earth oxides comprise at least one of $La_2O_3$, $CeO_2$, $Y_2O_3$ and $Sc_2O_3$.

18. A glass composition suitable for fiber forming comprising:
$SiO_2$ 50-60 weight percent;
$Al_2O_3$ 24-35 weight percent;
MgO 2-12 weight percent;
CaO 0.5-7 weight percent;
$Na_2O$ 0-2 weight percent;
$K_2O$ 0-1 weight percent;
$Li_2O$ 1-3 weight percent;
$B_2O_3$ 0-3 weight percent;
$Fe_2O_3$ 0-1 weight percent;
$F_2$ 0-2 weight percent;
$TiO_2$ 0-2 weight percent;
ZnO 0-3 weight percent;
BaO 0-6.5 weight percent; and
other constituents 0-8 weight percent total.

19. The composition of claim 18 wherein the CaO content is less than 4 weight percent.

20. The composition of claim 18, wherein the MgO+CaO content is less than 16 weight percent.

21. The composition of claim 18 further comprising: at least one rare earth oxide in an amount greater than about 0.05 weight percent.

22. The composition of claim 21 wherein the one or more rare earth oxides are present in an amount up to about 8 weight percent.

* * * * *